US011536159B1

(12) United States Patent
Ellwood, III et al.

(10) Patent No.: US 11,536,159 B1
(45) Date of Patent: Dec. 27, 2022

(54) BEARING ASSEMBLY FOR SUPPORTING ROTATION OF A SHAFT IN A TURBOCHARGER

(71) Applicant: BorgWarner Inc., Auburn Hills, MI (US)

(72) Inventors: Erwin Perry Ellwood, III, Candler, NC (US); Kenneth Richard Bischof, Arden, NC (US); Raj Chandramohanan, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/553,901

(22) Filed: Dec. 17, 2021

(51) Int. Cl.
*F01D 25/18* (2006.01)
*F01D 25/16* (2006.01)
*F02C 6/12* (2006.01)
*F16C 33/58* (2006.01)
*F16C 33/66* (2006.01)
*F16C 27/04* (2006.01)

(52) U.S. Cl.
CPC .............. *F01D 25/164* (2013.01); *F02C 6/12* (2013.01); *F16C 27/045* (2013.01); *F16C 33/581* (2013.01); *F16C 33/6681* (2013.01); *F05D 2220/40* (2013.01); *F05D 2240/54* (2013.01); *F05D 2260/98* (2013.01); *F16C 2360/24* (2013.01)

(58) Field of Classification Search
None
See application file for complete search history.

(56) References Cited

U.S. PATENT DOCUMENTS

| 4,116,502 A * | 9/1978 | Horler | F16C 33/6659 |
| | | | 384/126 |
| 10,495,144 B1 | 12/2019 | Ellwood, III et al. | |
| 2017/0058909 A1 * | 3/2017 | Barber | F16C 33/6637 |
| 2020/0340531 A1 | 10/2020 | Ziegelhoefer et al. | |

FOREIGN PATENT DOCUMENTS

| CN | 107250584 A * | 10/2017 | F01C 21/02 |
| DE | 102007013727 A1 * | 11/2008 | F01D 25/16 |
| DE | 102014213256 B3 * | 11/2015 | F01D 25/16 |
| DE | 102015207394 A1 * | 10/2016 | F16C 19/163 |
| ES | 2913299 T3 * | 6/2022 | F16C 19/08 |
| JP | 2012180886 A * | 9/2012 | F16C 33/44 |
| JP | 5910058 B2 * | 4/2016 | F16C 19/548 |

* cited by examiner

*Primary Examiner* — Michael Lebentritt
(74) *Attorney, Agent, or Firm* — Howard & Howard Attorneys PLLC

(57) ABSTRACT

A bearing assembly for supporting rotation of a shaft in a turbocharger includes an inner race extending along an axis. The inner race is configured to be coupled to the shaft. The bearing assembly also includes an outer race spaced radially from the inner race and a cage disposed radially between the inner race and the outer race. The bearing assembly further includes a rolling element disposed radially between the outer race and the inner race. The rolling element is disposed within the cage for supporting rotation of the shaft. The outer race defines a lubricant passageway configured to direct lubricant toward the cage.

20 Claims, 4 Drawing Sheets

BEARING ASSEMBLY FOR SUPPORTING ROTATION OF A SHAFT IN A TURBOCHARGER

BACKGROUND OF THE INVENTION

1. Field of the Invention

The invention generally relates to a turbocharger including a bearing assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed in the turbine housing interior for receiving exhaust gas from the internal combustion engine, and a shaft coupled to and rotatable by the turbine wheel. Typical turbochargers also include a compressor housing defining a compressor housing interior, and a compressor wheel disposed in the compressor housing interior and coupled to the shaft. The compressor wheel is rotatable by the shaft for delivering compressed air to the internal combustion engine. Specifically, energy from the exhaust gas from the internal combustion engine, which would normally be wasted energy, is used to rotatably drive the turbine wheel, which is used to rotatably drive the shaft and, in turn, rotatably drive the compressor wheel to compress air and deliver compressed air to the internal combustion engine.

Commonly, turbochargers include a bearing assembly disposed about the shaft. The bearing assemblies are known to support rotation of the shaft. Moreover, the bearing assemblies known in the art commonly include various components which are required lubricated by a lubricant. However, bearing assemblies known in the art are subject to failure due a failure to adequately provide lubricant to the various components of the bearing assemblies. More specifically, failure to adequately provide lubricant to the various components of the bearing assemblies can result in degradation of the small amount of lubricant present on the various components of the bearing assemblies due to increased heat generated by friction between various components of the bearing assemblies during operation of the turbocharger. Moreover, repeated wear on various components of the bearing assemblies can result due to the failure to adequately provide lubricant to the various components. Repeated wear on various components of the bearing assemblies can also increase noise, vibration, and harshness (NVH) of the turbocharger. Repeated wear on various components of the bearing assemblies can also result in functional failure of the bearing assemblies in supporting rotation of the shaft. Functional failure of the bearing assemblies in supporting rotation of the shaft damages the turbocharger.

As such, there remains a need for an improved bearing assembly for a turbocharger.

SUMMARY OF THE INVENTION AND ADVANTAGES

A bearing assembly for supporting rotation of a shaft in a turbocharger includes an inner race configured to be coupled to the shaft, an outer race spaced radially from the inner race, and a cage disposed radially between the inner race and the outer race. The bearing assembly also includes a rolling element disposed radially between the outer race and the inner race. The rolling element is disposed within the cage for supporting rotation of the shaft. The outer race defines a lubricant passageway configured to direct lubricant toward the cage.

Because the lubricant passageway is configured to direct lubricant toward the cage, the cage is adequately lubricated by the lubricant. Adequate lubrication of the cage by the lubricant prevents failure of the bearing assembly. More specifically, the lubricant lowers friction between the rolling element, the outer race, the inner race, and the cage and also limits degradation of the lubricant surrounding the cage which would result from heat generated by friction between the rolling element, the outer race, the inner race, and the cage during operation of the turbocharger. Thus, because the lubricant passageway is configured to direct lubricant toward the cage, cooling is also provided to the rolling element, the outer race, the inner race, and the cage resulting from an increased amount of lubricant surrounding the cage, further preventing degradation of the lubricant than may result from heat generated by friction between the rolling element, the outer race, the inner race, and the cage during operation of the turbocharger.

Moreover, wear on the rolling element, the outer race, the inner race, and the cage is limited because the cage is adequately lubricated by the lubricant directed toward the cage by the lubricant passageway. Accordingly, because wear of the rolling element, the outer race, the inner race, and the cage is limited, noise, vibration, and harshness (NVH) of the turbocharger is also limited. Functional failure of the bearing assembly in supporting rotation of the shaft is also prevented because wear of the rolling element, the outer race, the inner race, and the cage is limited. Thus, damage to the turbocharger is prevented.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
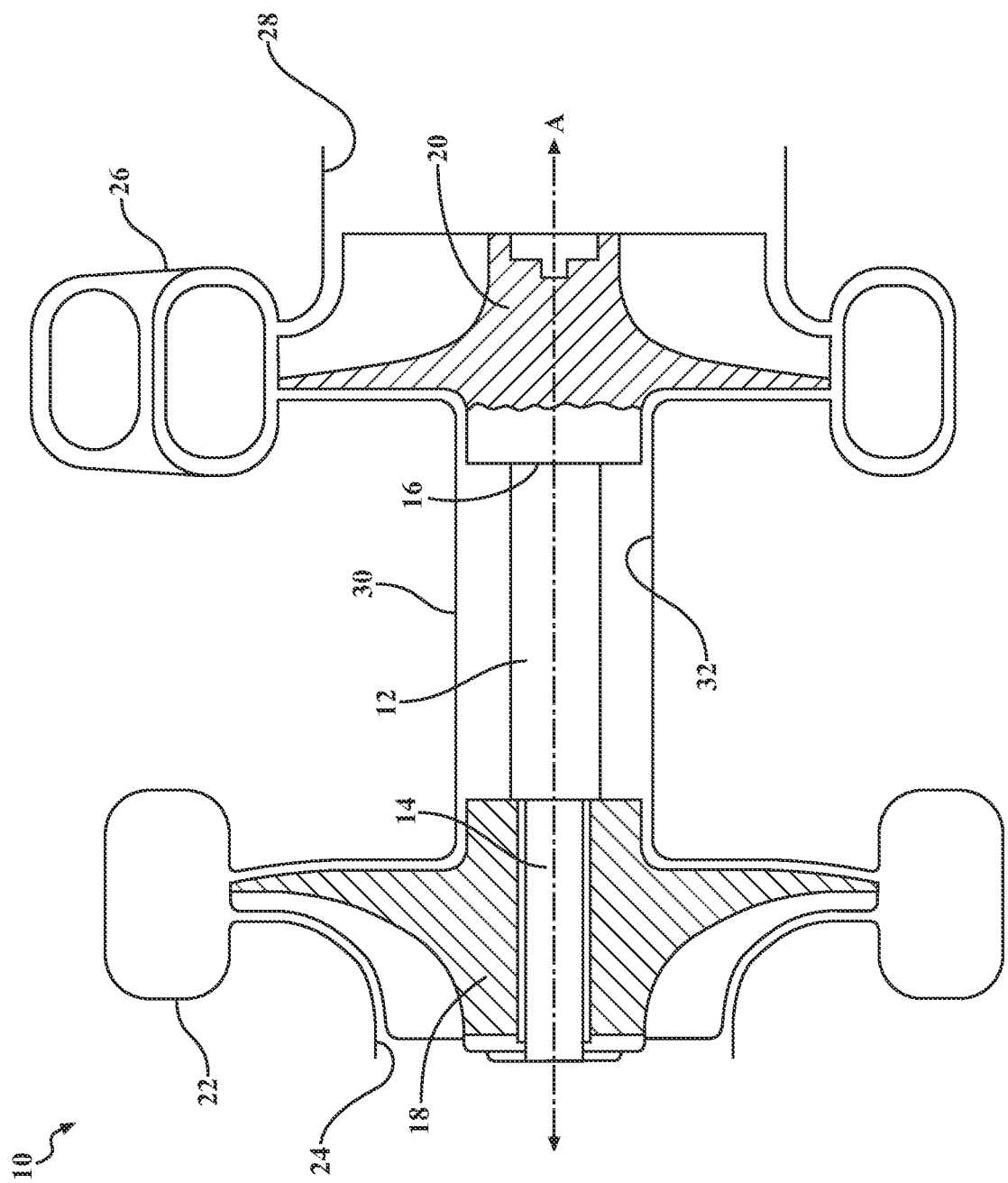
FIG. 1 is schematic illustration turbocharger including a shaft extending along an axis, a compressor wheel coupled to the shaft, and a turbine wheel coupled to the shaft.

With reference to the Figures, wherein like numerals indicate like parts throughout the several views, a turbocharger 10 for delivering compressed air to an internal combustion engine includes a shaft 12 extending along an axis A between a first shaft portion 14 and a second shaft portion 16 spaced from the first shaft portion 14 along the axis A. The turbocharger 10 includes a compressor wheel 18 coupled to the first shaft portion 14 of the shaft 12 and a turbine wheel 20 coupled to the second shaft portion 16 of the shaft 12. The turbocharger 10 may include a compressor housing 22 defining a compressor housing interior 24 in which the compressor wheel 18 is disposed, and a turbine housing 26 defining a turbine housing interior 28 in which the turbine wheel 20 is disposed. The turbocharger may also include a bearing housing 30 defining a bearing housing interior 32. The turbocharger 10 also includes a bearing assembly 34 for supporting rotation of the shaft 12. The bearing assembly 34 may be disposed in the bearing housing interior 32.

The bearing assembly 34 includes an inner race 36 coupled to the shaft 12, an outer race 38 spaced radially from the inner race 36, and a cage 40 disposed radially between the inner race 36 and the outer race 38. The bearing assembly 34 also includes a rolling element 42 disposed radially between the outer race 38 and the inner race 36. The rolling element 42 is disposed within the cage 40 for supporting rotation of the shaft 12. The outer race 38 defines a lubricant passageway 44 configured to direct lubricant toward the cage 40.

Because the lubricant passageway 44 is configured to direct lubricant toward the cage 40, the cage 40 is adequately lubricated by the lubricant. Adequate lubrication of the cage 40 by the lubricant prevents failure of the bearing assembly 34. More specifically, the lubricant lowers friction between the rolling element 42, the outer race 38, the inner race 36, and the cage 40 and thus limits degradation of the lubricant surrounding the cage 40 which would result from heat generated by friction between the rolling element 42, the outer race 38, the inner race 36, and the cage 40 during operation of the turbocharger 10. Thus, because the lubricant passageway 44 is configured to direct lubricant toward the cage 40, cooling is also provided to the rolling element 42, the outer race 38, the inner race 36, and the cage 40 resulting from an increased amount of lubricant surrounding the cage 40, further preventing degradation of the lubricant than may result from heat generated by friction between the rolling element 42, the outer race 38, the inner race 36, and the cage 40 during operation of the turbocharger 10.

Moreover, wear on the rolling element 42, the outer race 38, the inner race 36, and the cage 40 is limited because the cage 40 is adequately lubricated by the lubricant directed toward the cage 40 by the lubricant passageway 44. Accordingly, because wear of the rolling element 42, the outer race 38, the inner race 36, and the cage 40 is limited, noise, vibration, and harshness (NVH) of the turbocharger 10 is also limited. Functional failure of the bearing assembly 34 in supporting rotation of the shaft 12 is also prevented because wear of the rolling element 42, the outer race 38, the inner race 36, and the cage 40 is limited. Thus, damage to the turbocharger 10 is also prevented.

The turbocharger 10 may further include an electric machine 46, such as an electric motor and/or an electric generator, disposed about the shaft 12. The electric machine 46 may be disposed in the bearing housing interior 32 of the bearing housing 30. The electric machine 46 may include a rotor 48 coupled to the shaft 12 and configured to rotate with the shaft 12, a stator 50 spaced radially from the rotor 48 and including a plurality of windings which are capable of being energized to impart rotational energy to the rotor 48, and thus to the shaft 12. The electric machine 46 may assist the turbocharger 10 in delivering compressed air to the internal combustion engine by increasing the rotational speed of the shaft 12 if the exhaust gas from the internal combustion engine is inadequate in imparting rotational energy to the turbine wheel 20.

Although not required, the cage 40 may have an inner cage surface 52 facing the rolling element 42, and the inner cage surface 52 of the cage 40 defines a cage interior 54. As discussed above, the rolling element 42 may be disposed within the cage 40. More specifically, the rolling element 42 may be disposed within the cage interior 54 defined by the inner cage surface 52 of the cage 40. It is to be appreciated that the rolling element 42 need not be disposed completely within the cage 40 and the rolling element 42 need not be disposed completely within the cage interior 54 defined by the inner cage surface 52 of the cage 40. Instead, the rolling element 42 need only be partially surrounded by the cage 40 to be within the cage 40. Additionally, the cage 40 may have a coating or a surface treatment applied to harden the cage 40 and further reduce wear on the cage 40. The rolling element 42 of the bearing assembly 34 may be a ball bearing. It is to be appreciated, however, that the rolling element 42 may be any number of geometric shapes, including cylindrical, and may be bushings or roller bearings.

The cage 40 may extend from a first cage end 56 at a first location 58 along the axis A to a second cage end 60 at a second location 62 along the axis A different from the first location 58. A distance D may be defined between the first location 58 along the axis A and the second location 62 along the axis A.

Although not required, the lubricant passageway 44 may be within a lubricant boundary LB defined as between 25% of the distance D from the first location 58 along the axis A and 25% of the distance from the second location 62 along the axis A. Said differently, the lubricant passageway 44 may be within 25% of the distance D from the first location 58 and/or the lubricant passageway 44 may be within 25% of the distance D from the second location 62 along the axis A. It is to be appreciated that the lubricant passageway 44 may be within 20% of the distance D from one of the first location 58 along the axis A and the second location 62 along the axis A, within 15% of the distance D from one of the first location 58 along the axis A and the second location 62 along the axis A, within 10% of the distance from one of the first location 58 along the axis A and the second location 62 along the axis A, and/or within 5% of the distance from one of the first location 58 along the axis A and the second location 62 along the axis A. It is also to be appreciated that, in the embodiments where the lubricant passageway 44 is within 20%, 15%, 10%, and/or 5% of the distance D from one of the first location 58 along the axis A and the second location 62 along the axis A, the lubricant passageway 44 may still be between the first location 58 along the axis A and the second location 62 along the axis A. Said differently, the lubricant passageway 44 being within 20%, 15%, 10%, and/or 5% of the distance D from the first location 58 along the axis A and the second location 62 along the axis A defines the lubricant boundary LB for the lubricant passageway 44 as an outermost limit and does not preclude the lubricant passageway 44 from being, in a non-limiting example, defined equidistantly between the first location 58 along the axis A and the second location 62 along the axis A.

The outer race 38 may have an inner surface 64 facing the inner race 36. The outer race may also have an outer surface 66 facing away from the inner race 36. The outer race 38 may also have a radial surface 68 defined extending radially away from the axis A1. The inner surface 64 of the outer race 38 may define an outlet 70 in fluid communication with the lubricant passageway 44. The outer surface 66 of the outer race 38 may also define an inlet 72 in fluid communication with the lubricant passageway 44. However, it is also to be appreciated that the radial surface 68 may define the inlet 72 in fluid communication with the lubricant passageway 44. Lubricant may flow through the outer race 38 by entering the inlet 72, flowing through the lubricant passageway 44, and dispelling from the outlet 70. The outlet 70 may be configured to direct the lubricant toward the cage 40 of the bearing assembly 34. It is to be appreciated that the inlet 72 may be defined as a groove extending at least partially about the axis A. Alternatively, it is to be appreciated that the inlet 72 may be defined as a counterbore.

In one embodiment, at least a portion of the lubricant passageway 44 is between the first location 58 along the axis A and the second location 62 along the axis A. In other words, not all of the lubricant passageway 44 need be between the first location 58 along the axis A and the second location 62 along the axis A. In a non-limiting example, the inlet 72 and the outlet 70 may be outside of the first location 58 along the axis A and the second location 62 along the axis A, but the portion of the lubricant passageway 44 may nonetheless be between the first location 58 along the axis A and the second location 62 along the axis A.

Although not required, at least a portion of the outlet 70 may be between the first location 58 along the axis A and the second location 62 along the axis A. In other words, a portion of the outlet 70 may be outside of between the first location 58 along the axis A and the second location 62 along the axis A and the portion of the outlet 70 may be between the first location 58 along the axis A and the second location 62 along the axis A. Because the portion of the outlet 70 is between the first location 58 along the axis A and the second location 62 along the axis A, the lubricant passageway 44 is assisted in directing lubricant toward the cage 40. It is also to be appreciated that all of the outlet 70 may be between the first location 58 along the axis A and the second location 62 along the axis A, further assisting the lubricant passageway 44 in directing lubricant toward the cage 40.

Moreover, at least a portion of the inlet 72 may be between the first location 58 along the axis A and the second location 62 along the axis A. In other words, a portion of the inlet 72 may be outside of between the first location 58 along the axis A and the second location 62 along the axis A and the portion of the inlet 72 may be between the first location 58 along the axis A and the second location 62 along the axis A. Because the portion of the inlet 72 is between the first location 58 along the axis A and the second location 62 along the axis A, the lubricant passageway 44 is assisted in directing lubricant toward the cage 40. It is also to be appreciated that all of the inlet 72 may be between the first location 58 along the axis A and the second location 62 along the axis A, further assisting the lubricant passageway 44 in directing lubricant toward the cage 40.

Although not required, it is to be appreciated that all of the inlet 72 may be between the first location 58 along the axis A and the second location 62 along the axis A, all of the lubricant passageway 44 may be between the first location 58 along the axis A and the second location 62 along the axis A, and all of the outlet 70 may be between the first location 58 along the axis A and the second location 62 along the axis A. Moreover, it is to be appreciated that the lubricant passageway 44 may be defined radially through the outer race 38 normal to the axis A. In other words, the inlet 72 and the outlet 70 may be defined at the same location along the axis A and the lubricant passageway 44 may be defined as a straight passageway directly between the inlet 72 and the outlet 70.

The inlet 72 may have an axial width of between about 0.1 and about 2 millimeters, between about 0.2 and about 1.8 millimeters, between about 0.3 and about 1.6 millimeters, between about 0.4 and about 1.4 millimeters, between about 0.5 and about 1.2 millimeters, between about 0.6 and about 1 millimeters, and about 0.8 millimeters. Moreover, the outlet 70 may have an axial width of between about 0.1 and about 2 millimeters, between about 0.2 and about 1.8 millimeters, between about 0.3 and about 1.6 millimeters, between about 0.4 and about 1.4 millimeters, between about 0.5 and about 1.2 millimeters, between about 0.6 and about 1 millimeters, and about 0.8 millimeters. Additionally, although not required, the lubricant passageway 44 may be further defined as a lubricant jet. Moreover, the lubricant passageway 44 may have a nozzle configuration.

In one embodiment, the lubricant passageway 44 is further defined as a primary lubricant passageway 74 and the outer race 38 further defines a secondary lubricant passageway 76. The second lubricant passageway 76 may be defined through the outer race 38. The secondary lubricant passageway 76 is spaced from the primary lubricant passageway 74 along the axis A. The secondary lubricant passageway 76 need not be configured to direct lubricant toward the cage 40; however, it is to be appreciated that the secondary lubricant passageway 76 may be configured to direct lubricant toward the cage 40 and, optionally, may selectively include any combination of characteristics of the primary lubricant passageway 74 as described herein. The secondary lubricant passageway 76 may assist in providing lubricant to components of the bearing assembly 34 other than, or in addition to, the cage 40.

The bearing assembly 34 may further include a squeeze film damper cup 78 rotationally fixed relative to the outer race 38 such that the outer race 38 is disposed radially between the squeeze film damper cup 78 and the inner race 36. It is to be appreciated that the squeeze film damper cup 78 and the outer race 38 may be formed integrally with one another. Alternatively, the squeeze film damper cup 78 and the outer race 38 may be separate components. In the embodiments where the squeeze film damper cup 78 is a separate component from the outer race 38, the outer race 38 may be press-fit in, or otherwise physically affixed to, the squeeze film damper cup 78. In the embodiments with the squeeze film damper cup 78, the lubricant passageway 44 may be defined through the squeeze film damper cup 78. The squeeze film damper cup 78 may also define the inlet 72 and may also define the outlet 70.

The cage 40 of the bearing assembly 34 may have an outer cage surface 80 facing the inner surface 64 of the outer race 38. The outlet 70 may be configured to direct lubricant toward the outer cage surface 80 of the cage 40. It is to be appreciated that the outlet 70 may be aligned with the outer cage surface 80 of the cage 40.

Further, the cage 40 of the bearing assembly 34 may have a first outer portion 82 adjacent to the first cage end 56. The first outer portion 82 of the cage 40 has a first radial height RH1. The cage 40 of the bearing assembly 34 may also have a second outer portion 84 adjacent to the second cage end 60. The second outer portion 84 of the cage 40 has the first radial height RH1. In other words, the first outer portion 82 of the cage 40 and the second outer portion 84 of the cage 40 have the same radial height. The cage 40 of the bearing assembly 34 may further have a middle portion 86 disposed axially between the first outer portion 82 and the second outer portion 84. The middle portion 86 of the cage 40 has a second radial height RH2 different than the first radial height RH2 of the first outer portion 82 and the second outer portion 84. More specifically, the second radial height RH2 of the middle portion 86 may be less than the first radial height RH1 of the first outer portion 82 and the second outer portion 84. It is to be appreciated that the first radial height RH1 and the second radial height RH2 do not refer to relative distances from the axis A, but instead to relative lengths of the components themselves. Therefore, the first radial height RH1 and the second radial height RH2 may extend to the same radial distance from the shaft 12.

Moreover, although not required, the outlet 70 may be aligned with the first outer portion 82 of the cage 40 or the second outer portion 84 of the cage 40. The outlet 70 may be configured to direct lubricant to the first outer portion 82 of the cage 40 and/or the second outer portion 84 of the cage 40.

Figure 3A:
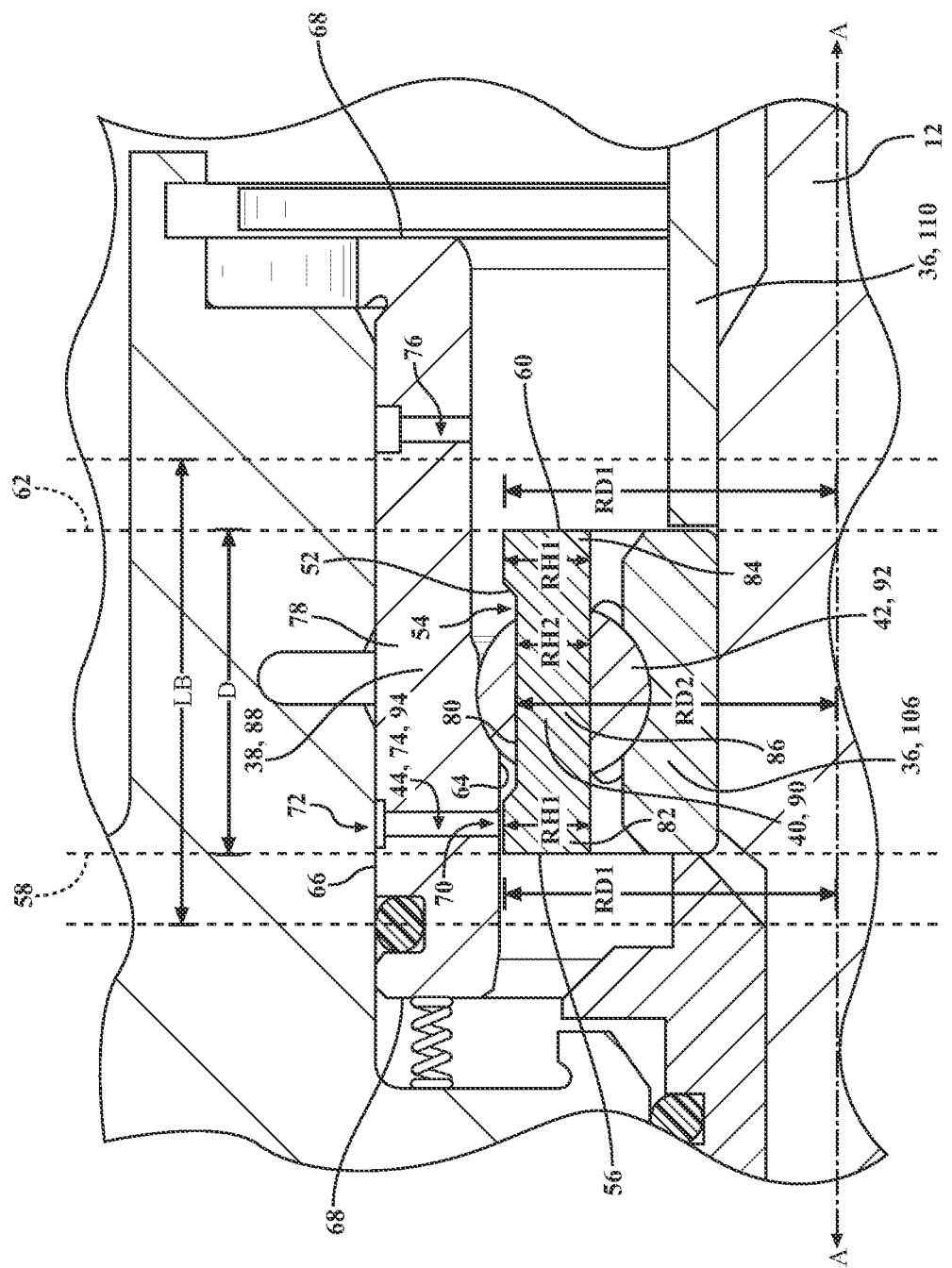
FIG. 3A is a cross-sectional view of the first outer race, the first cage, the first rolling element, and the inner race.
Figure 3B:
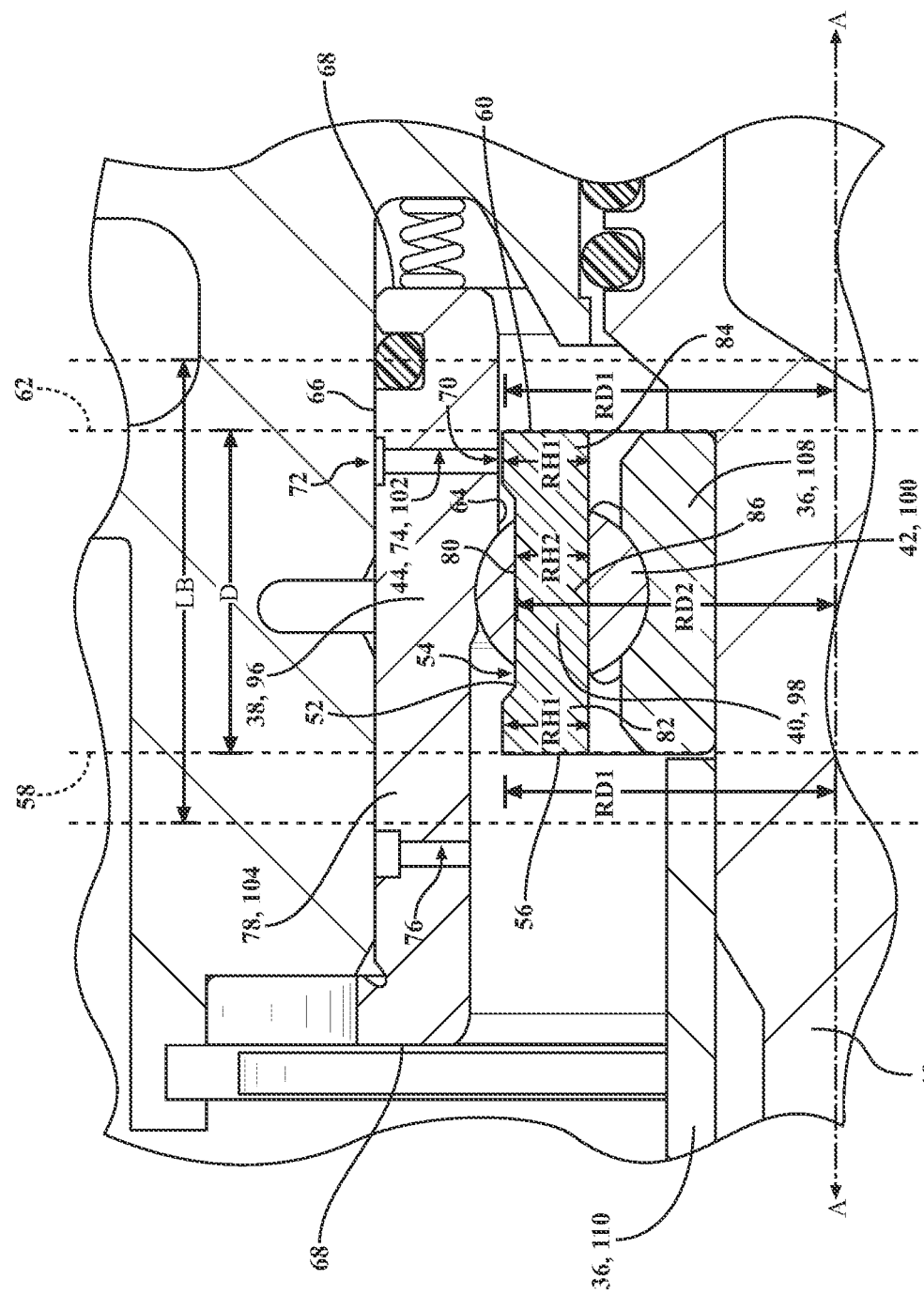
FIG. 3B is a cross-sectional view of the second outer race, the second cage, the second rolling element, and the inner race.

Additionally, as shown in FIGS. 3A and 3B, the outer cage surface 80 at the first outer portion 82 may extend a first radial distance RD1 from the axis A and the outer cage surface 80 at the second outer portion 84 may extend the first radial distance RD1 from the axis A. The outer cage surface 80 at the middle portion 86 may extend a second radial distance RD2 from the axis A. The second radial distance RD2 may be less than the first radial distance RD1. Therefore, in this embodiment, the outer cage surface 80 of the cage 40 defines an indentation which forms a gap between the middle portion 86 of the cage 40 and the outer race 38 of the bearing assembly 34. However, alternatively, it to be appreciated that the outer cage surface 80 at the first outer portion 82, the second outer portion 84, and the middle portion 86 may all extend the first radial distance from the axis A while the first outer portion 82 and the second outer portion 84 have the first radial height RH1 and the middle portion 86 has the second radial height RH2.

Figure 2:
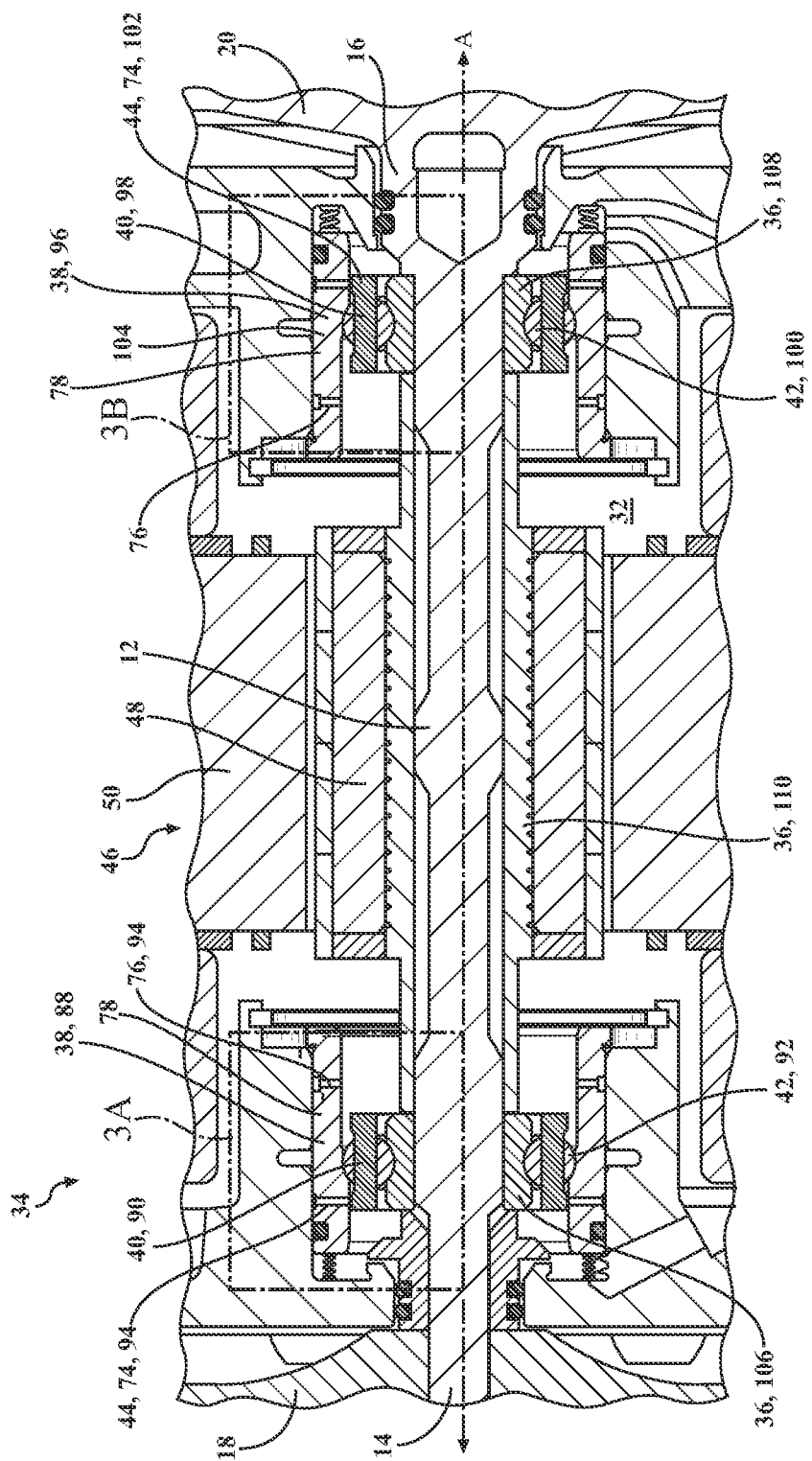
FIG. 2 is a cross-sectional view of the turbocharger of FIG. 1, with the turbocharger including a bearing assembly for supporting rotation of the shaft, and with the bearing assembly including an inner race, a first outer race, a second outer race, a first cage, a second cage, a first rolling element, a second rolling element, a first biasing member, and a second biasing member.

It is to be appreciated that the outer race 38 may be further defined as a first outer race 88, the cage 40 may be further defined as a first cage 90, the rolling element 42 may be further defined as a first rolling element 92, and the primary lubricant passageway 74 may be further defined as a first primary lubricant passageway 94, as shown in FIGS. 2 and 3A. As shown in FIGS. 2 and 3B, the bearing assembly 34 may further include a second outer race 96 spaced from the first outer race 88 along the axis A and spaced radially from the inner race 36. The bearing assembly 34 may also include a second cage 98 disposed radially between the inner race 36 and the second outer race 96. The bearing assembly 34 may also include a second rolling element 100 disposed radially between the second outer race 96 and the inner race 36. The second rolling element 100 is disposed within the second cage 98 for supporting rotation of the shaft 12. The second outer race 96 may define a second primary lubricant passageway 102 through the second outer race 96. The second primary lubricant passageway 102 is configured to direct lubricant toward the second cage 98. The second primary lubricant passageway 102 provides the advantages of the first primary lubricant passageway 94 as described above. The second primary lubricant passageway 102, optionally, may selectively include any combination of characteristics of the first primary lubricant passageway 94 as described herein. Moreover, the second outer race 96, the second cage 98, and the second rolling element 100, optionally, may selectively include any combination of characteristics of the first outer race 88, the first cage 90, and the first rolling element 92 as described herein. For instance, in a non-limiting example, the second outer race 96 may be rotationally fixed relative to a second squeeze film damper cup 104 such that the second outer race 96 is disposed radially between the second squeeze film damper cup 104 and the inner race 36.

The inner race 36 of the bearing assembly 34 may be of numerous designs. In one embodiment, the inner race 36 is a unitary component. In other words, the inner race 36 may extend approximately between the first and second shaft portions 14, 16 of the shaft 12 such that the inner race 36 is a single piece between the first and second rolling elements 92, 100.

Alternatively, the inner race 36 may include a first inner race 106 disposed between the first outer race 88 and the shaft 12, and may include a second inner race 108 disposed between the second outer race 96 and the shaft 12. In the embodiments with the first and second inner races 106, 108, the first inner race 106 and the second inner race 108 are separate components. The first inner race 106 may extend approximately from the first shaft portion 14 of the shaft 12 toward the second inner race 108. Similarly, the second inner race 108 may extend approximately from the second shaft portion 16 of the shaft 12 toward the first inner race 106. The first and second inner races 106, 108 may contact one another in a location disposed approximately between the first and second shaft portions 14, 16 of the shaft 12. The first and second inner races 106, 108 may be symmetrically mirrored about the location disposed approximately between the first and second shaft portions 14, 16 of the shaft 12.

In yet another embodiment, the bearing assembly 34 further includes a spacer 110 disposed between the first inner race 106 and the second inner race 108 to hold the first inner race 106 between the first outer race 88 and the shaft 12, and to hold the second inner race 108 between the second outer race 96 and the shaft 12. The spacer 110 may be disposed in the location disposed approximately between the first and second shaft portions 14, 16 of the shaft 12. The spacer 110 is comparatively inexpensive and allows for the first and second inner races 106, 108 to be smaller, thus saving manufacturing costs of the first and second inner races 106, 108. In the embodiments with the spacer 110, the first and second inner races 106, 108 may also be symmetrically mirrored about the location disposed approximately between the first and second shaft portions 14, 16 of the shaft 12.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A bearing assembly for supporting rotation of a shaft in a turbocharger, said bearing assembly comprising:

an inner race extending along an axis and configured to be coupled to the shaft;

an outer race spaced radially from said inner race;

a cage disposed radially between said inner race and said outer race; and a rolling element disposed radially between said outer race and said inner race, and disposed within said cage for supporting rotation of the shaft;

wherein said outer race defines a lubricant passageway configured to direct lubricant toward said cage.

2. The bearing assembly as set forth in claim 1, wherein said cage extends from a first cage end at a first location along said axis to a second cage end at a second location along said axis different from said first location, wherein a distance is defined between said first location and said second location, and wherein said lubricant passageway is within a lubricant boundary defined as between 25% of said distance from said first location and 25% of said distance from said second location.

3. The bearing assembly as set forth in claim 1, wherein said cage extends from a first cage end at a first location along said axis to a second cage end at a second location along said axis different from said first location, and wherein at least a portion of said lubricant passageway is between said first location and said second location.

4. The bearing assembly as set forth in claim 3, wherein said outer race has an inner surface facing said inner race, wherein said inner surface of said outer race defines an outlet in fluid communication with said lubricant passageway, and wherein at least a portion of said outlet is between said first location and said second location.

5. The bearing assembly as set forth in claim 4, wherein all of said outlet is between said first location and said second location.

6. The bearing assembly as set forth in claim 1 further comprising a squeeze film damper cup rotationally fixed relative to said outer race such that said outer race is disposed radially between said squeeze film damper cup and said inner race.

7. The bearing assembly as set forth in claim 6, wherein said lubricant passageway is defined through said squeeze film damper cup.

8. The bearing assembly as set forth in claim 4, wherein said cage has an outer cage surface facing said inner surface of said outer race, and wherein said outlet is configured to direct lubricant toward said outer cage surface of said cage.

9. The bearing assembly as set forth in claim 4, wherein said cage has a first outer portion adjacent to said first cage end and having a first radial height, a second outer portion adjacent to said second cage end having said first radial height, and a middle portion disposed axially between said first outer portion and said second outer portion, wherein said middle portion has a second radial height less than said outer radial height, and wherein said outlet is aligned with said first outer portion of said cage or said second outer portion of said cage.

10. The bearing assembly as set forth in claim 4, wherein said cage has an outer cage surface facing said inner surface of said outer race, wherein said outer cage surface at said first outer portion extends a first radial distance from said axis, wherein said outer cage surface at said second outer portion extends said first radial distance from said axis, wherein said outer cage surface at said middle portion extends a second radial distance from said axis, wherein said second radial distance is less than said first radial distance, and wherein said outlet is aligned with said first outer portion of said cage or said second outer portion of said cage.

11. The bearing assembly as set forth in claim 1, wherein said lubricant passageway is defined radially through said outer race normal to said axis.

12. The bearing assembly as set forth in claim 1, wherein said lubricant passageway is further defined as a primary lubricant passageway, and wherein said outer race further defines a secondary lubricant passageway spaced from said primary lubricant passageway along said axis.

13. A turbocharger for delivering compressed air to an internal combustion engine, said turbocharger comprising:

a shaft extending along an axis between a first shaft portion and a second shaft portion spaced from said first shaft portion along said axis;

a compressor wheel coupled to said first shaft portion of said shaft;

a turbine wheel coupled to said second shaft portion of said shaft; and a bearing assembly for supporting rotation of said shaft, said bearing assembly comprising:

an inner race coupled to said shaft;

an outer race spaced radially from said inner race;

a cage disposed radially between said inner race and said outer race; and a rolling element disposed radially between said outer race and said inner race, and disposed within said cage for supporting rotation of said shaft;

wherein said outer race defines a lubricant passageway configured to direct lubricant toward said cage.

14. The turbocharger as set forth in claim 13, wherein said cage extends from a first cage end at a first location along said axis to a second cage end at a second location along said axis different from said first location, wherein a distance is defined between said first location and said second location, and wherein said lubricant passageway is within a lubricant boundary defined as between 25% of said distance from said first cage end and 25% of said distance from said second cage end.

15. The turbocharger as set forth in claim 13, wherein said cage extends from a first cage end at a first location along said axis to a second cage end at a second location along said axis different from said first location, and wherein at least a portion of said lubricant passageway is between said first location and said second location.

16. The turbocharger as set forth in claim 15, wherein said outer race has an inner surface facing said inner race, wherein said inner surface of said outer race defines an outlet in fluid communication with said lubricant passageway, and wherein at least a portion of said outlet is between said first location and said second location.

17. The turbocharger as set forth in claim 16, wherein all of said outlet is between said first location and said second location.

18. The turbocharger as set forth in claim 13 further comprising a squeeze film damper cup rotationally fixed relative to said outer race, wherein said lubricant passageway is defined through said squeeze film damper cup.

19. The turbocharger as set forth in claim 13, wherein said lubricant passageway is defined radially through said outer race normal to said axis.

20. The turbocharger as set forth in claim 13, wherein said lubricant passageway is further defined as a primary lubricant passageway, and wherein said outer race further defines a secondary lubricant passageway spaced from said primary lubricant passageway along said axis.

* * * * *